Sept. 12, 1961 T. BÅSEN 2,999,748
PROCESS OF REDUCING MOLDED BODIES COMPRISING METALLIC OXIDES
Filed Nov. 24, 1959
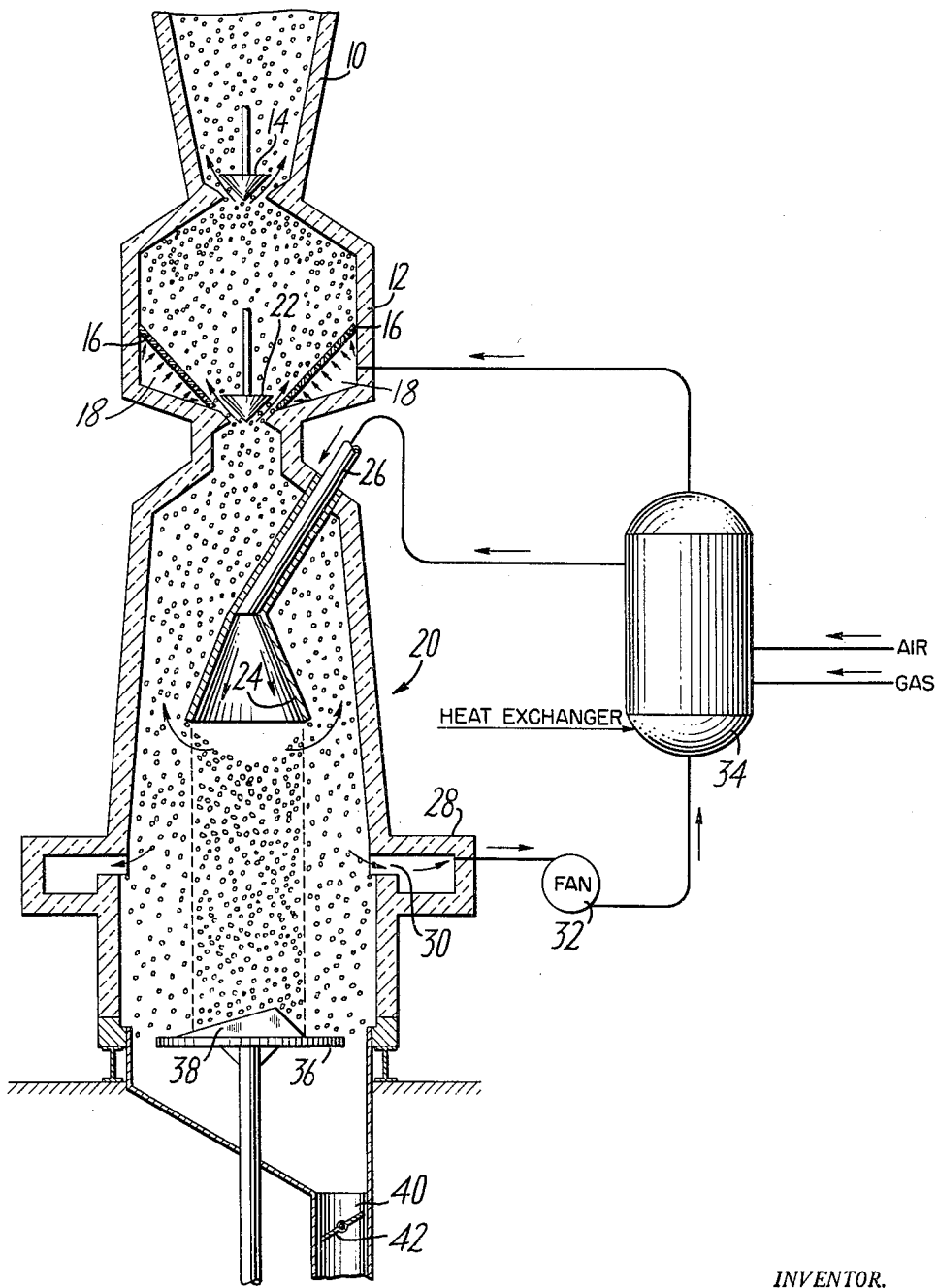
INVENTOR.
TORALV BÅSEN
BY
ATTORNEYS.

United States Patent Office 2,999,748
Patented Sept. 12, 1961

2,999,748
PROCESS OF REDUCING MOLDED BODIES
COMPRISING METALLIC OXIDES
Toralv Båsen, Vagsbygd pr. Kristiansand S., Norway, assignor to Elektrokemisk A/S, Oslo, Norway, a corporation of Norway
Filed Nov. 24, 1959, Ser. No. 855,048
Claims priority, application Norway Nov. 27, 1958
5 Claims. (Cl. 75—36)

This invention relates to preheating of molded aggregates comprising a metal oxide and a reducing agent in the form of pellets, briquettes or the like.

This invention primarily relates to treating aggregates comprising iron oxide, by which term it is intended to include usual iron ores and also ores or mixtures comprising iron oxide and oxides of some other metal such as chromium or manganese. In any case the iron is finally reduced to a metallic state in an electric furnace and if another metal oxide is also present it will likewise be reduced to form an iron alloy.

Since this invention relates to the preliminary treatment of the pellets or briquettes, actually the composition is not highly critical provided that the pellets contain a material to be reduced or reacted with carbon, and some carbonaceous material adapted to react in this way is mixed in. Thus this process may be used for example in the production of calcium carbide. However, for the purpose of illustration this process is described in connection with ordinary iron ore.

It has previously been suggested that pellets comprising iron oxide and a carbonaceous reducing agent may be preheated and partially reduced in a shaft furnace to which air is admitted under controlled conditions so that the air can react and burn with CO evolved by reaction of the carbonaceous reducing agent and the oxide combined with the metal. Unfortunately such process has been found in some instances to result in local overheating of the ore causing it to sinter in certain areas and in such case there is a tendency for the sintered ore to stick to the inside of the shaft furnace and lodge and interfere with the operation.

According to the present invention air which may be combined with some CO gas is admitted into the central portion of the shaft furnace and moves in the same direction as the aggregates of oxide that are being treated. In ordinary case this means that both the aggregates and combustion gases will move downwardly in the furnace.

When this is done, it may result in local sintering but such sintering will take place only in the central part of the shaft and even though this forms a more or less rigid core, the aggregates in the outer area of the shaft (that is those that contact the lining) will remain separate and free flowing, and as a result the charge will move continuously downward as the material is removed from the bottom of the shaft. It is easily possible at that point to break up and remove the bottom of the sintered core so that it will move with the loose pellets that surround it.

The reaction gases which are withdrawn from the charge near the bottom of the shaft can advantageously be returned to the upper part of the shaft above the point where the primary combustion gases are introduced and in such case these recycled gases will dry and preheat the ingoing charge. Before being used for this purpose these gases may be used for preheating the combustion gases and air which are introduced into the shaft.

This invention may be readily understood by reference to the accompanying drawing which shows in section a type of shaft that may be used in carrying out the invention and shows diagrammatically the connections of this shaft to other standard units of equipment.

In carrying out this invention molded aggregates such as briquettes or pellets are formed as for example by mixing together finely divided iron ore with a carbonaceous reducing agent such as powdered coal or coke in an amount which should be sufficient to supply a slight excess over all the carbon necessary for complete reduction of the oxide. This mixture is pelletized usually with a binder present. Such a binder may for example be Portland or alumina cement or other usual form of binder such as lime hydrate, concentrated waste liquor from sulfite pulp industry and other bituminous binders. The aggregates should be strong enough so that they will not readily disintegrate during passage through the shaft.

In carrying out the invention pellets such as described are introduced into the hopper 10 and from there they are passed downward into the prewarming chamber 12. Their movement is controlled by a valve indicated at 14. The chamber 12 is provided with a perforated bottom 16 forming a circular chamber 18 for admission of gas for prewarming and drying the charge.

From the chamber 12 the charge moves into the shaft furnace 20, the movement being controlled by a valve indicated at 22. The pellets move downwardly in the shaft furnace 20 and as they move they pass around an inverted funnel-like member 24. Member 24 is connected to a pipe 26 through which air and ordinarily some CO gas is admitted.

The function of the funnel-like member 24 is to distribute in the central part of the shaft air to cause combustion of CO in the furnace. Ordinarily, and particularly during start-up, some CO will be introduced with this air and the air and gas should be preheated say to a temperature of around 1000° C. This gas will burn at the opening of the funnel 24 and will cause volatiles from the coal and generated CO to be driven out of the charge. These ingredients will themselves burn and thereby will supply substantially all of the fuel for preheating the charge. The temperature should be high enough to cause substantial reduction in the oxygen content of the charge and as stated, it may be high enough to cause some sintering of the charge to take place, but it should not be high enough to sinter the charge all the way to the side walls. The temperature of the charge may, for example, be in the range of from 800° C. to 1300° C.

It is important that the combustion gases move downward with the charge, both to continue the heating action and also to prevent any of the combustion gases passing directly upwardly where they might preheat the charge sufficiently to cause volatiles to escape from the charge before those volatiles reach the combustion zone. In order to insure that the combustion gases will thus move downwardly with the charge and in order to withdraw them from the bottom of the furnace, the shaft 20 is provided with a gas collecting ring 28 connected to the shaft by a series of peripherally arranged openings as indicated at 30.

As shown diagrammatically in the drawing, the gas collecting ring 28 is connected to the intake side of a fan 32 which preferably maintains a slight negative pressure in the ring 28. The hot gases drawn out by this fan are than passed through a heat exchanger 34 where they give up their heat to the air and CO gas which are admitted into the pipe 26. The gases from the heat exchanger 26 which have thus given up their heat to the air and to the CO are in turn admitted into the circular chamber 18 and pass through the perforated bottom 16 into the incoming charge in the prewarming chamber 12. Thus the incoming charge is warmed somewhat and in particular any excess moisture is driven off.

It is ordinarily desirable to make up the aggregates with the use of a relatively inexpensive coal such as steam coal and since the volatiles from such coal are driven off at temperatures only a little above 300° C. it is desirable that the gases passing into the chamber 12 should not be substantially above that temperature. Of course if coke is used in the pellets a somewhat higher temperature may be employed.

It will be noted that in operating this process the CO evolved in the heating of the charge is burned to supply the heat for such heating and also to supply the heat for the preliminary drying of the charge in a separate step. Some sintering of the charge may take place but this is toward the center of the shaft and roughly may follow the area between the broken lines shown in the drawing. However, as stated above, the aggregates in the outer area of the shaft that contact the lining wll remain separate and free flowing. As a result the sintering of the charge that does take place will not cause lodging or hanging of the charge.

As shown in the drawing, a rotating discharge table 36 is provided at the bottom of the shaft and this may be provided with eccentrically placed wings as indicated at 38. These wings will tend to break up the bottom portion of the sintered charge. The sintered and partially reduced aggregates will leave the shaft through a discharge pipe 40 which may be provided with a valve 42.

The sintered charge may be discharged directly into an electric smelting furnace or it may be taken to storage. It will be noted that since the ring 28 is somewhat above the bottom of the shaft 20 and since the combustion gases are sucked out through the ring 28 the portion of the shaft below the ring 28 may serve as a cooling chamber where the pellets may cool below reoxidation temperatures in a reducing atmosphere. This is particularly important if the prereduction has been carried out at the upper end of the temperature range and some reduction to the metallic state has taken place.

What I claim is:

1. In the process of treating iron oxides for use in an electric smelting furnace the steps of forming molded aggregates of the oxide and a corbonaceous reducing agent, passing such aggreates downwardly in the shaft, heating such aggregates in a central portion of the shaft to a temperature between 800° C. and 1300° C. at which the reducing agent is caused to react with the oxide to generate CO and supplying air to the central portion of the shaft whereby such generated CO from the charge is burned in the central portion of the shaft continuouslly to heat the charge as it moves down whereby some sintering may take place in the portion of the charge toward the center while the aggregates in the outer area of the shaft that contact the lining remain separate and free flowing so that lodging of the charge is prevented, and causing the products of combustion to move downwardly in the shaft from the combustion zone so volatiles are not driven out of the charge before it reaches the combustion zone.

2. A process as specified in claim 1 in which the central portion of the charge is heated above the sintering point while the peripheral portions of the charge remain at a temperature below the sintering point so that they move freely in the shaft.

3. A process as specified in claim 2 in which the sintered central portion of the charge is broken up at the bottom of the shaft so that the charge can move steadily downward.

4. A process as specified in claim 1 in which the carbonaceous reducing agent is coal and in which the products of combustion withdrawn from the shaft are cooled and introduced into the charge above the combustion zone at a temperature below the volatilization point of the carbonaceous reducing agent and are caused to move upwardly through the charge in countercurrent flow to dry and warm such charge.

5. A process as specified in claim 4 in which the products of combustion are used to preheat the air introduced into the central portion of the shaft before such products of combustion are reintroduced into the upper portion of the charge.

References Cited in the file of this patent

UNITED STATES PATENTS

| | | |
|---|---|---|
| 1,166,904 | Harding | Jan. 4, 1916 |
| 1,289,800 | Jones | Dec. 31, 1918 |
| 2,684,897 | Diettrich | July 27, 1954 |
| 2,739,055 | Gallusser | Mar. 20, 1956 |
| 2,793,109 | Huebler et al. | May 21, 1957 |